United States Patent [19]

Kaiser et al.

[11] Patent Number: 5,211,051
[45] Date of Patent: May 18, 1993

[54] METHODS AND APPARATUS FOR IMPROVING SENSOR PERFORMANCE

[75] Inventors: William J. Kaiser, West Covina; Thomas W. Kenny, Glendale, both of Calif.; Joseph K. Reynolds, Austin, Tex.; Thomas R. Van Zandt, Redondo Beach, Calif.; Steven B. Waltman, Boulder, Colo.

[73] Assignee: California Institute of Technology, Pasadena, Calif.

[21] Appl. No.: 735,628

[22] Filed: Jul. 25, 1991

Related U.S. Application Data

[63] Continuation-in-part of Ser. No. 685,553, Apr. 15, 1991, and a continuation-in-part of Ser. No. 118,733, Nov. 9, 1987, abandoned.

[51] Int. Cl.$^5$ ............................................. G01P 15/08
[52] U.S. Cl. ........................................................ 73/1 D
[58] Field of Search ................. 73/1 D, 1 DV, 517 R, 73/517 B, 517 A, 105, 701; 250/306, 307, 311

[56] References Cited

U.S. PATENT DOCUMENTS 3,908,460 9/1975 Lichowsky ............................ 73/701
4,359,892 11/1982 Schnell et al. ......................... 73/105

OTHER PUBLICATIONS

Félix Rudolf et al, Silicon Microaccelerometer, Sensors and Actuators 4, 191 (1983).
Widge Henrion et al, Wide Dynamic Range Direct Digital Accelerometer, Technical Digest, IEEE Solid-State Sensor and Actuator Workshop, IEEE Catalog 90CH2783-9 (1990), p. 153.
Diederik W. de Bruin et al, Second-Order Effects in Self-Testable Accelerometers, Technical Digest, IEEE Solid-State Sensor and Actuator Workshop, IEEE Catalog 90CH2783-9 (1990), p. 149.
Kinkel et al., "Automatic Calibration of Transducers", Oct. 1953, Instruments, vol. 26.
Burnham et al., "Measuring the Nanomechanical Properties and Surface Force of Materials Using an Atomic Force Microscope", Naval Research Laboratory, Washington, DC, Aug. 1989.

*Primary Examiner*—Robert Raevis
*Attorney, Agent, or Firm*—Benoit Law Corporation

[57] ABSTRACT

Methods and apparatus for improving performance of a sensor having a sensor proof mass elastically suspended at an initial equilibrium position by a suspension force, provide a tunable force opposing that suspension force and preset the proof mass with that tunable force to a second equilibrium position less stable than the initial equilibrium position. The sensor is then operated from that preset second equilibrium position of the proof mass short of instability. The spring constant of the elastic suspension may be continually monitored, and such continually monitored spring constant may be continually adjusted to maintain the sensor at a substantially constant sensitivity during its operation.

21 Claims, 5 Drawing Sheets

METHODS AND APPARATUS FOR IMPROVING SENSOR PERFORMANCE

DESCRIPTION

The invention described herein was made in the performance of work under a NASA contract, and is subject to the provisions of Public Law 96-517 (35 USC 202) in which the Contractor has elected to retain title.

CROSS-REFERENCE

This is a continuation-in-part of patent application Ser. No. 07/685,553 filed Apr. 15, 1991 for Tunnel Effect Measuring Systems and Particle Detectors, as a continuation-in-part of patent application Ser. No. 07/118,733, filed Nov. 9, 1987 (abandoned) for Tunnel Effect Measuring Systems and Particle Detectors, both assigned to the common assignee and herewith incorporated by reference herein.

FIELD OF THE INVENTION

The subject invention relates to sensors and, more specifically, to systems with spring suspended sensor masses.

BACKGROUND OF THE INVENTION

Sensors having a sensor mass suspended by a spring suspension are well known. For instance, accelerometers and seismometers measure acceleration by measuring the deflection of an elastically supported proof mass. The sensitivity and bandwidth of such sensors are determined by the sensitivity and bandwidth of the motion detection electronics, the spring constant of the elastic support, and the value of the proof mass. Given wide bandwidth electronics, the sensor system bandwidth is determined by the mechanical resonance frequency of the spring-supported proof mass according to the equation:

$$2\pi f_R = (k/m)^{\frac{1}{2}} \qquad (1)$$

wherein:
$f_R$ = resonance frequency
k = spring constant
m = mass

At and below this frequency the sensitivity of the mechanical system is at a maximum. Above $f_R$ the sensitivity of the system falls inversely proportonal to the square of the frequency. However, the sensitivity of the mechanical system is also inversely proportional to $f_R$ for frequencies below $f_R$. Therefore, the selection of $f_R$ by design of the mechanical structure is critical for determining the useful operating range of the sensor. In particular, it is clear that the sensor may not be optimized for wide bandwidth and high sensitivity simultaneously. Also, many seismometer, accelerometer and other sensor systems require large proof masses, and large sensor volume for adequate sensitivity.

In this respect and in general, sensitivity has continued to be a problem. For instance, temperature variations, non-linearity of suspension springs, overdrive, and other factors, all have contributed to significant sensitivity variations or degradations.

A linearizing scheme has been proposed by Felix Rudolf et al, in an article entitled SILICON MICROACCELEROMETER, Sensors and Actuators 4, 191 (1983). That article proposes an electrostatic force balancing accelerometer system in which a closed feedback loop arrangement restores the mass and thereby its spring suspension to a quiescent position at which the spring suspension has its quiescent spring constant. The advantage which a reduced spring constant would provide is thus lost in that approach.

Electrostatic force feedback is also used in accelerometers disclosed by Widge Henrion et al, in an article entitled WIDE DYNAMIC RANGE DIRECT DIGITAL ACCELEROMETER, and by Diederik W. de Bruin et al, in an article entitled SECOND-ORDER EFFECTS IN SELF-TESTABLE ACCELEROMETERS, both Technical Digest, IEEE Solid-State Sensor and Actuator Workshop, IEEE Catalog 90CH2783-9 (1990).

That article mentions that as the electrostatic force increases, the restoring force of the spring suspension is no longer able to counter the electrostatic force, causing the mass to move until it rests against its over-force stops, once the mass has traveled about half of the gap spacing. The mass is thus held by the electrostatic force and can only be released from such hold if the electrostatic voltage is reduced to the point where the restoring force of the spring suspension exceeds the electrostatic force again.

Since such reduced voltage is lower than the voltage at which the mass is pulled against its stops, there is a hysteresis in the force versus voltage curve.

While that article mentions that effective sensitivity increases with increasing electrode voltage, it also points out that the spring constant of the spring suspension system increases with increasing deflection. That article proposes improving damping by placing multiple channels into the structure while maximizing the electrode area, and notes that the effect therein disclosed allows for electronic tuning of the frequency response, concluding, however, that performance accuracy deteriorates when the deflection is not a small fraction of the gap, mentioning about 10% by way of example.

This confirms the prior-art opinion that operation of spring suspended sensor systems with a greatly reduced spring constant would introduce hysteresis and instability of operation, and would be undesirable. Also, various passive approaches attempted to deal with varying sensor sensitivity and even degraded performance for that reason.

SUMMARY OF THE INVENTION

It is a general object of the invention to overcome the above mentioned prior-art prejudice and to increase sensor sensitivity.

It is a germane object of the invention to provide methods and apparatus for improving sensor performance.

It is also an object of the invention to provide improved sensing methods and improved sensors.

Other objects of the invention will become apparent in the further course of this disclosure.

The invention resides in methods and apparatus for improving performance of a sensor having a sensor proof mass elastically suspended at an initial equilibrium position by a suspension force, comprising in combination the steps of, or means for, providing a tunable force opposing that suspension force, presetting the proof mass with that tunable force to a second equilibrium position less stable than the initial equilibrium position, and operating the sensor from the preset second equilibrium position of the proof mass short of instability.

The invention resides also in such methods and apparatus including the steps of, or means for, monitoring a spring constant of an elastic suspension of the proof mass, and for continually adjusting the monitored spring constant to maintain the sensor at a substantially constant sensitivity during its operation.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
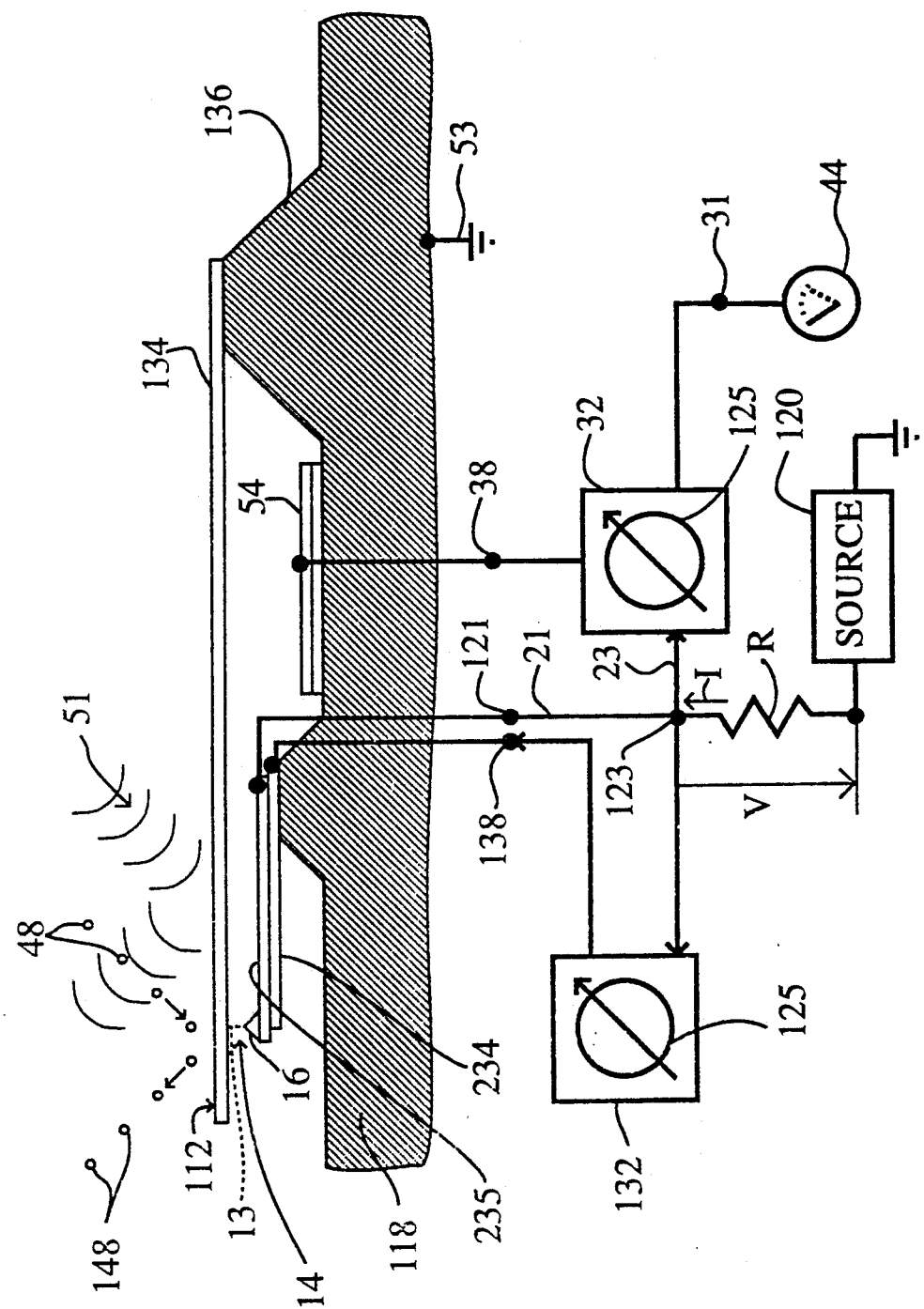
FIG. 1 is a diagrammatic view and block diagram of a sensor system according to a first embodiment of the invention.

The drawing illustrates methods and apparatus 10 for measuring forces acting on an object. According to the embodiment of FIG. 1, that method and apparatus provide an electric tunneling current 13 through a gap 14 between an electrode 16 and the object 112. In the operation of that method and apparatus, the gap 14 is varied with a force acting on the object 112, and a corresponding variation in the tunneling current is sensed. The applied force or its magnitude may then be determined in response to variations in the tunneling current 13. By way of example and not by way of limitation, such determination or measurement may be effected in the context of a constant voltage source or a constant current source. If a constant voltage source is employed, then a measurement of the applied force may be derived from a change in current flowing to the electrode 16 or gap 14. On the other hand, in the case of a constant current source, variations in a voltage drop would be indicative or tunneling gap variations and applied forces.

Figure 2:
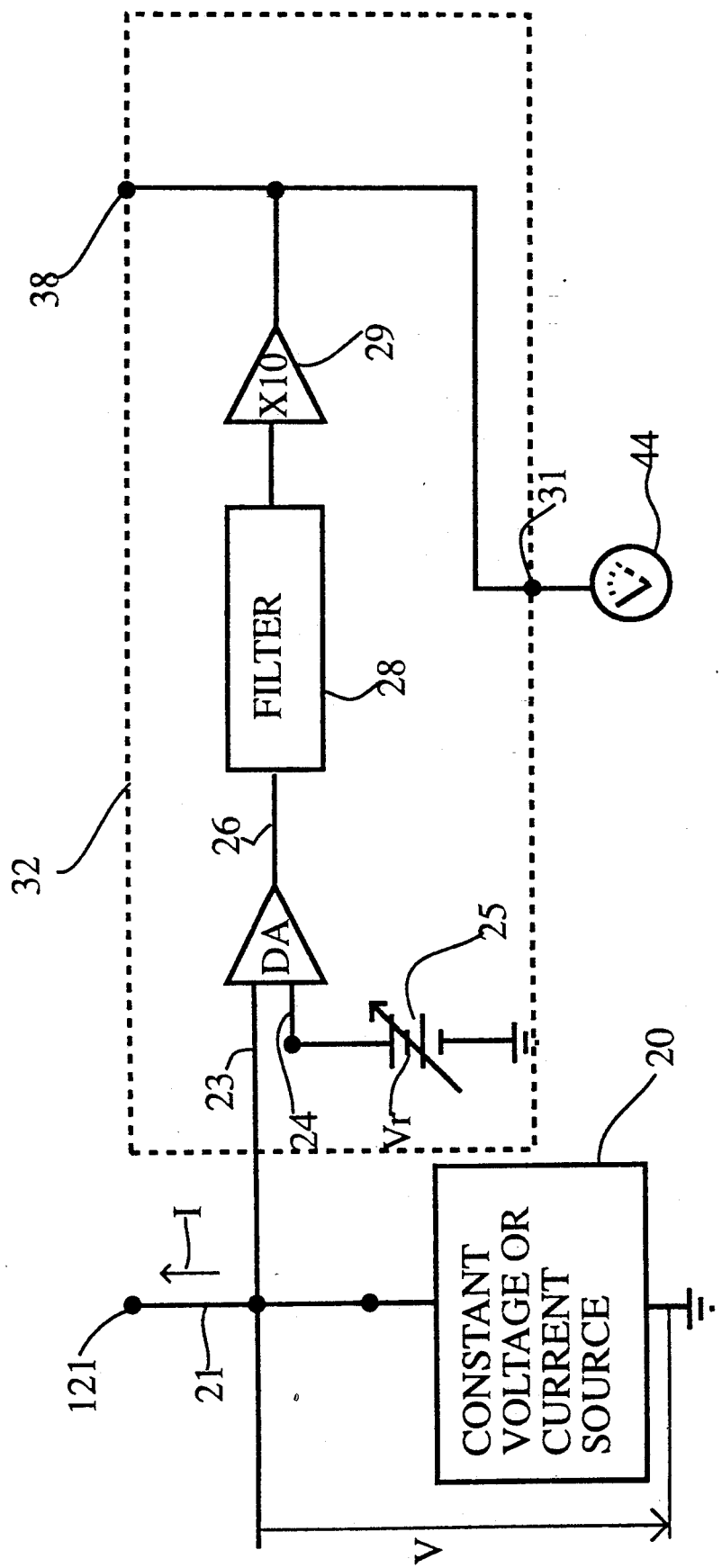
FIG. 2 is a block diagram of a power supply and of a servo or feedback system for the embodiments of FIGS. 1 and 3 to 5 of the invention.

Accordingly, while the schematic of FIG. 1 contemplates a constant voltage source at 120, a constant current source alternatively could be employed for supplying the tunneling current 13, as illustrated by an arrow denoting the supply current, I. If the voltage is maintained constant, the voltage drop resistor R may be omitted as shown in FIG. 2, since the current, I, from the source then varies as the gap 14 is varied. However, as shown at 20 in FIG. 2, either a constant voltage source or a constant current source can be employed If the current, I, is maintained constant, then a voltage has to vary instead. In this respect, the illustrated embodiment of FIG. 1 connects a resistor R in series with a constant voltage source 120 and the gap 14 or electrode 16. A voltage drop, v, occurs across that resistor R, when current, I, flows in the current supply lead 21 to the gap 14 via terminal 121.

The illustrated embodiment observes a voltage, v, caused by current, I, from the source 120 when the gap 14 has a quiescent value; that is, for instance, when no force is applied. The illustrated apparatus or its equivalent then derives a measurement of such a force from a change in that voltage.

Illustrated embodiments of the invention may be employed to sense a variation in the tunneling current or voltage across the gap or, generically, an electrical property of that gap 14, corresponding to a variation in the gap 14 by a force. For instance, if the gap 14 is varied by a force on the object 112 while the rate of flow, I, is maintained constant by a constant current source, then there is a corresponding variation in the voltage drop across the gap 14 and a corresponding change in the voltage, v, across that current supply.

On the other hand, if the source is a constant voltage source as in FIG. 1, then there is a change in the rate of tunneling current flow as well, when the gap 14 is diminished by a force on the object 112.

These and other alternatives within the scope of the subject invention may be summarized by saying that an electrical property of the gap or its variation of that electrical property in response to a variation in that gap 14 is sensed and is employed to determine the force or other agency causing that gap variation.

A preferred embodiment of the invention elastically suspends the object 112, and such elastically suspended object may be restored in position in response to variation of an electrical property of the gap 14. In this respect, embodiments of the invention integrate the object 112 with an elastic beam 134 which has a fixed end attached to a mesa 136 of the supporting structure 118 and has a free end as a tunneling electrode opposite the tunneling tip 16 across the gap 14.

Of course, within the scope of the subject invention, the elastic beam 134 actually may carry a distinct object, such as a "proof mass," as found in accelerometers and the like. However, in accordance with an embodiment of the invention, the object or "proof mass" is actually integrated with or constituted by the elastic beam 134 or, in effect, by a free end thereof at the tunneling gap 14.

Also, within the scope of the illustrated preferred embodiment of the invention, the elastic beam 134 is made deflectable by a feedback signal, as more fully disclosed below. By way of example, the elastic beam may include a piezoelectric bimorph deflectable by the feedback or loop signal. However, the beam 134 preferably is adjusted and repositioned in space by an agency other than piezoelectric forces. For instance, magnetic or electrostatic forces may be employed for that purpose.

As indicated at 53, the beam 134 may be grounded through the supporting structure 118. Such beam may then be driven with the aid of a counterelectrode 54 which in this case would be electrically insulated from the structure 118 but mechanically supported thereby at a sufficiently small distance from the electrically conductive beam 134 to permit attraction of the beam by high-voltage potentials applied to the insulated counterelectrode 54 via terminal 38. That terminal has a feedback circuit or servo loop 32 connected thereto. In principle, the tunneling tip 16 could be attached to a free end of the beam 134 or the beam can act as a tunneling counterelectrode for the tunneling current 13, as in FIG. 1, for instance.

According to the embodiment shown in FIG. 1, a second beam 234 is employed. That beam may be a duplicate of the beam 134, or a piezoelectric bimorph may be employed.

Electric energy for the tunneling current 13 is supplied in any suitable manner. By way of example, FIG. 1 shows the constant voltage source 120 which supplies a current I through resistor R and supply lead 21. The tunneling tip 16 is connected to the electric current supply lead 21 through a conductive layer 235 which is insulated from the beam 234.

An embodiment of the invention thus provides or has a constant voltage source 120 for the electric tunneling current 13, and responds with the servo loop 32 to a change in voltage caused by current from that source in response to each variation of the gap 14. Restoration of the position of the beam is effected in response to that change in voltage.

Alternatively, as explained above, a constant current source may be provided for the electric tunneling current 13, and the response with the servo loop 32 is also to a change in voltage caused by current from that source in response to each variation of the gap 14. Restoration of the position of the beam is again effected in response to that change in voltage.

FIG. 2 shows a circuit for the feedback loop 32 which may be used in the embodiments of FIGS. 1 and 3 to 5. The constant current source 20 may be replaced by constant voltage source 120 as discussed above.

By way of example, the embodiment of FIG. 2 employs a differential amplifier DA for observing the voltage, v, caused by current, I, from the source 20 when the gap 14 has a quiescent value. One input 23 of the differential amplifier is connected to the current supply lead 21 for that purpose, so as to receive an input signal corresponding to the value of the voltage, v. The other input 24 of the differential amplifier is connected to a source 25 of reference voltage, $V_R$. An arrow through the source 25 or the arrow at 125 in FIG. 1, indicates that the reference voltage is adjustable. Adjustable voltage sources are already customary in tunneling devices where they are also used for offsetting electrode and tip Fermi levels.

By way of example, the reference voltage $V_R$ may be adjusted at the source 25 to be equal to the voltage, v, across the resistor R when the gap 14 has its quiescent value, and the differential amplifier DA may signify such quiescent value of the tunneling gap by a zero output signal at 26.

The differential amplifier DA or functionally equivalent circuitry within the scope of the illustrated embodiment, in effect determines a change in voltage, v, caused by current, I, from the source 20 in response to the gap variation at 14, and derives a measurement of that force F from that change in that voltage, such as by comparing the value of that changed voltage to the reference voltage $V_r$. The resulting output signal of the differential amplifier is applied via output 26 to a filter 28 which may be employed for removing noise and undesired frequencies. The filter output may be further amplified by an amplifier 29 which applies its output signal to a terminal 31 as the output signal of the sensor or apparatus 10.

Variations of the tunneling gap 14 thus measured may be converted to a force indication on the basis of the elastic constant of the object suspension or beam 34. Alternatively, the apparatus 10 may be calibrated in terms of force.

Within the scope of the subject invention, a predetermined agency may be provided for restoring the gap 14 in response to variation of the tunneling current 13, and a quantity of that agency may be employed to a restoration of that gap. In that case, the force or its value may be determined from that quantity. By way of example, if the varied gap 14 is restored with an electric current, voltage or signal in response to variation of a predetermined electrical property of the gap 14, then a measurement of the force may be derived from that electric current, voltage or signal. Put otherwise, the tunneling gap 14 may be restored to its quiescent value in response to the above mention change in voltage, v, from which the value of the force is also derived.

FIG. 2 shows a practical embodiment for implementing these features within the scope of the subject invention. In particular, the drawing shows the differential amplifier DA, filter 28 and operational amplifier 29 arranged in a servo loop 32 which in effect includes the sensor itself to respond to each variation in an electrical property of the gap. The filter 28 thus may be a loop filter and the amplifier 29 may be a variable gain operational amplifier for increased stability, and/or may be a high-voltage amplifier for driving the beam 134.

The servo loop 32 also provides at the terminal 31 a servo loop output signal indicative of forces varying the tunneling gap 14.

As apparent from the drawing, the feedback signal with which elastic beam 134 is deflected, is derived from the servo loop 32 or is provided thereby. The beam 134, deflected by a force, is thus restored in position with the derived feedback or servo loop signal via terminal 38. Put differently, the servo loop 32 restores the tunneling gap 14 to its quiescent value.

With the constant current source 20, the servo loop 32 responds to a change in the output voltage of the source, and with the constant voltage source 120 the servo loop 32 responds to a change in voltage drop across resistor R, for instance, in response to tunneling gap or electrical gap property variation, derives the requisite feedback signal with the servo loop from that change in voltage or voltage drop, and restores the tunneling gap 14 or restores the deflected beam 134 in position with that derived feedback or servo loop signal.

In the case of the illustrated embodiment and its variations within the scope of the subject invention, the servo loop 32 also provides a servo loop output signal indicative of the input force, such as at the output terminal 31.

In this or any other manner, a tunneling current 13 is set up through the gap 14 between the tunneling tip 16 and the free end of the beam 134. Gravitational or inertial forces imparted to the beam 134 by impacting particles 48, wave energy or acoustic waves 51, or in any other manner, cause variation of the gap 14 and thereby of an electrical property of the gap 14 traversed by the tunneling current. Such imparted force or energy again manifests itself by variations of that electrical property and corresponding variations of the output voltage of the source 20 or of the voltage drop across the resistor R. Such voltage or voltage drop variations are picked up by the feedback circuits or servo loops 32 and 132 which correspond to the feedback circuit or servo loop shown and described in conjunction with FIG. 2. Instead of the variable reference voltage source 25, FIG.

1 shows corresponding adjustable reference voltage sources or other adjustable means 125 for its corresponding controls 32 and 132. In this respect, the second beam 234 may be employed for coarse adjustment via controllable servo loop 132. If that beam is of a piezoelectric type, the second servo loop 132 may drive that beam via a terminal 138.

In principle, inertial, gravitational or other force or energy measurements may be taken from either control 32 or 132, or from a combination thereof, even though FIG. 1 shows the measuring instrument 44 or equivalent means connected to the servo loop 32 via terminal 31.

Summarizing this disclosure, a preferred embodiment of the invention provides methods and apparatus for measuring a force acting on an object, such as the above mentioned object 112. This embodiment provides an elastic beam, such as the beam 134, for suspending the object 112 or any other object, and makes that elastic beam deflectable by an electrostatic feedback signal, such as with the aid of the counterelectrode 54. A tunneling tip 16, an electrode or the beam 134 itself, and a tunneling gap 14 are provided between that tunneling tip and that electrode or beam at 112.

Either the tunneling tip or a counterelectrode is connected to the elastic beam 134. This may be expressed by saying that one of that tunneling tip and that electrode is connected to that elastic beam.

An electric tunneling current 13 is provided through the tunneling gap 14 between said tunneling tip 16 and the electrode at 112 of the beam. That elastic beam 134 is deflected with the force 48 or 51 or the like to provide a variation in an electrical property of the gap 14 relating to the tunneling current 13.

That embodiment also provides a servo loop 32 responding to the mentioned variation in the electrical property, and derives the electrostatic feedback signal from that servo loop. That embodiment further, restores the deflected beam 134 in position with that derived electrostatic feedback signal, and provides a servo loop output signal, such as at 31, indicative of the force acting on the object.

In this respect and in general, it will, of course, be recognized that FIG. 1 shows a sensor having a sensor mass 112 suspended by a spring suspension 134. Pursuant to the subject invention, that spring suspension and mass are preset to a position where further movement of the mass 112 would produce instability, and the sensor is then operated from that preset spring suspension and position of that mass short of instability.

This will now be explained with the aid of FIG. 3, wherein the elastic beam 134 is shown as springs suspending the mass 112 of the beam as a proof mass relative to the support 118. This is, of course, what an elastic beam does. We shall assume that the proof mass supports a deflection electrode 154 and is suspended a distance d above a surface coated with the second deflection electrode 54. That electrode is also shown in FIG. 1 as acting on the beam 134 which in this respect is shown as the upper electrode 154 in FIG. 3. The electrodes 54 and 154 are shown insulated from ground or mass, such as by insulating layers 254 and 354, respectively. Electrode 154 may be grounded or the insulating layer 354 omitted.

The principle of the subject invention is also applicable to other suspension systems comprising some type of spring for which the restoring force has the following dependence on deflection, as it does in the case of beam 134:

$$F_s = kx^\alpha \quad (2)$$

where $\alpha$ is a real number greater than zero. For a linear spring (one which obeys Hooke's Law), $\alpha = 1$.

If a voltage, V, is applied to the deflection electrodes 54 and 154, an electrostatic force is exerted:

$$F_e = -\frac{\epsilon_0 A V^2}{d^2}, \quad (3)$$

where $\epsilon_0$ is the permittivity of free space, and A is the overlapping area of the deflection electrodes.

Upon the application of this force, the mass moves downward by a distance x, until a new equilibrium is established. The net force on the mass at any given position is given by:

$$F_{net} = F_s + F_e = kx^\alpha - \frac{\epsilon_0 A V^2}{(d-x)^2}. \quad (4)$$

The new equilibrium position is the point at which net force on the mass equals zero.

At any given equilibrium position, the mass responds to an additional external force with a displacement. The system is said to have an effective spring constant which characterizes the relation between applied force and deflection. The effective spring constant, 'k', is given by:

$$'k' = \frac{dF}{dx} = \alpha k x^{\alpha-1} - \frac{2\epsilon_0 A V^2}{(d-x)^3}. \quad (5)$$

Since the mass is at an equilibrium position, the net force is zero, so we obtain from eq. 3:

$$kx^\alpha = \frac{\epsilon_0 A V^2}{(d-x)^2}. \quad (6)$$

We may substitute into eq. 6 from eq. 5 to obtain the following expression for 'k':

$$'k' = \alpha k x^{\alpha-1} - \frac{2kx^\alpha}{(d-x)}. \quad (7)$$

Upon some rearrangement of this expression, we have:

$$'k' = kx^{\alpha-1}\left[\alpha - \frac{2x}{(d-x)}\right] \quad (8)$$

This expression for 'k' goes to zero for any value of when $$x = \frac{\alpha d}{2+\alpha}. \quad (9)$$

For the usual case of $\alpha = 1$, the effective spring constant goes to zero when the mass has been deflected by $\frac{1}{3}$ of the original separation, d, such as by the electrostatic force between electrodes 54 and 154. In practice this introduces hysteresis into, and produces instability of, the sensor operation, as shown in the Background set forth above, which was the primary reason why the prior art rejected such modes of operation.

The subject invention, on the other hand, improves sensor performance substantially by presetting the spring suspension and mass as disclosed above to a position where further movement would produce instability, and then operates the sensor from that new equilibrium position short of instability. The embodiment of FIG. 3 may be provided with a tunneling tip, capacitive plates or other sensor elements coupled to the mass 112 and connected to the terminal 121 of FIGS. 2 or 4, for instance.

To show the value of such an electrically tunable spring suspension, the expression for the sensitivity of a typical capacitively-coupled accelerometer will be derived.

Figure 4:
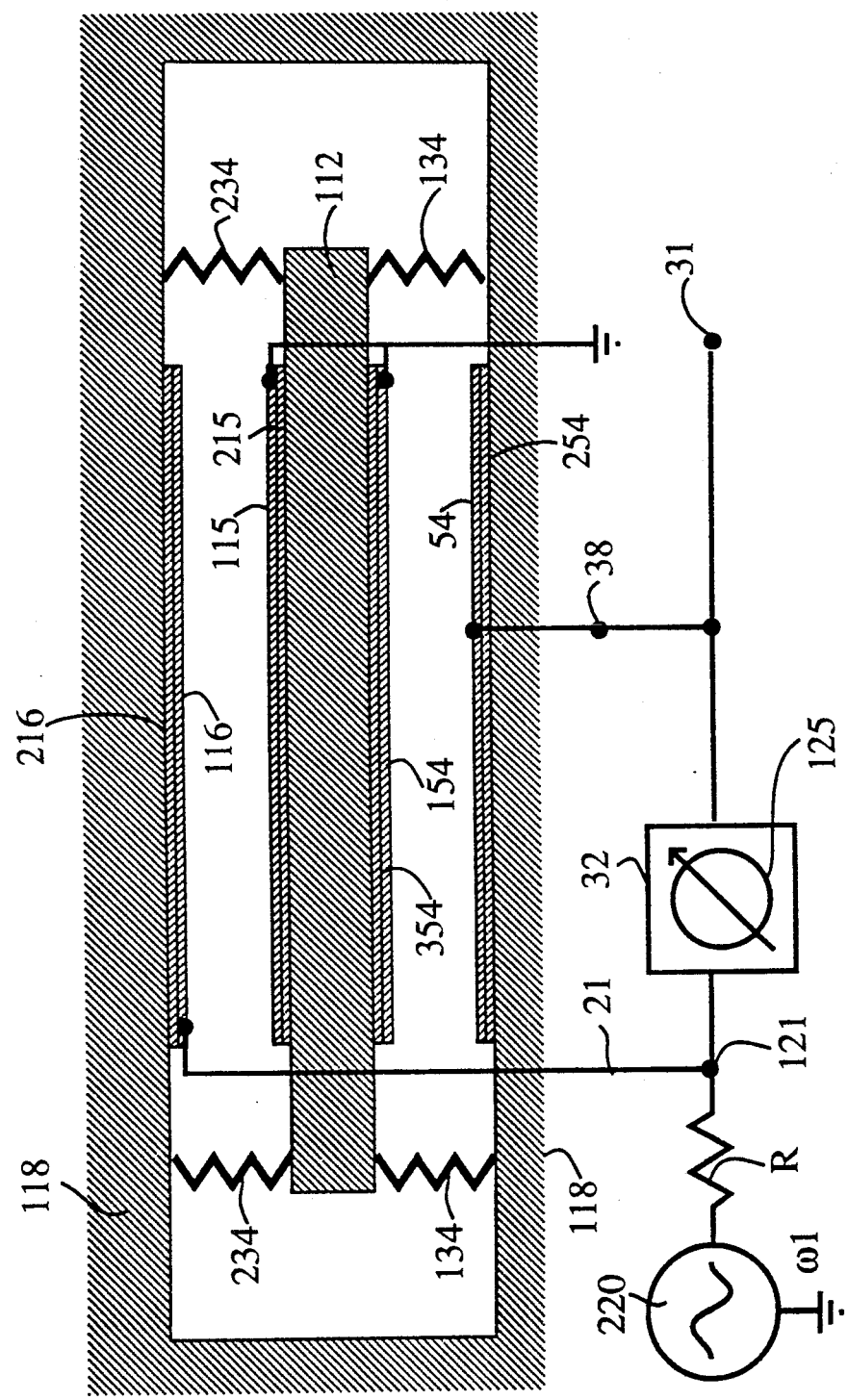
FIG. 4 is a longitudinal section and block diagram of a capacitive sensor system according to another embodiment of the invention.
Figure 5:
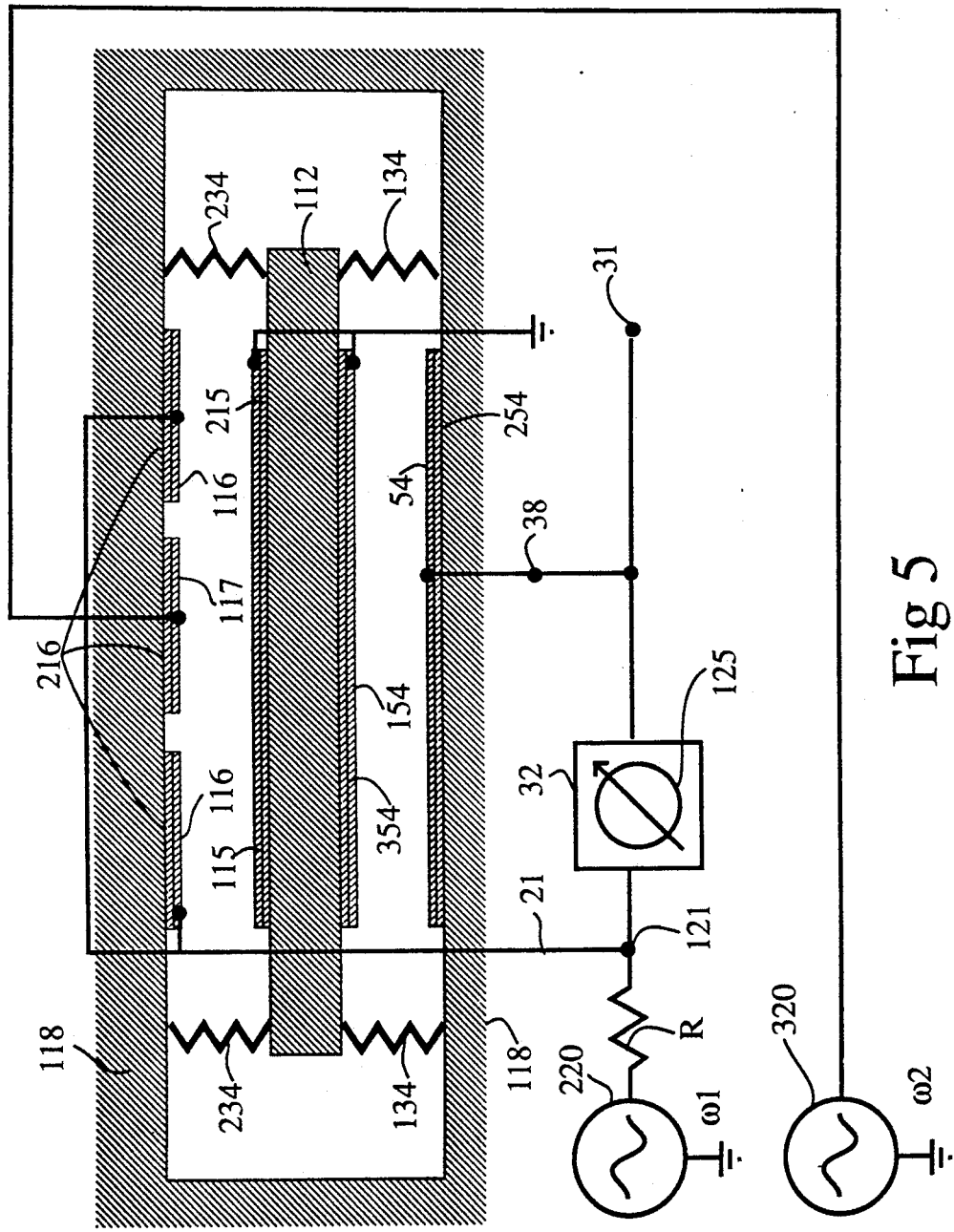
FIG. 5 is a longitudinal section and block diagram of a further sensor system with substantially constant increased sensitivity according to a further embodiment of the invention.

A typical capacitive accelerometer features a proof mass (m), supported from a frame by a spring with constant k, such as the mass 112 in the illustrated embodiments. One surface of the proof mass is coated or provided with an electrode 154 of area A or there is in effect such an electrode area by virtue of the presence of the counterelectrode 54 in the embodiment of FIG. 1, opposite the grounded beam 134. That grounded beam, or an electrode 154, is separated from a counter-electrode of the same area, such as 54, by a distance d or $x_0$. An ac voltage, $V_0$, is applied at frequency $\omega_1$ between the electrodes 54 and 134 or 154, such as via the feedback circuit shown in FIG. 2 or another feedback circuit, as shown in FIGS. 4 and 5.

When the structure is subjected to an acceleration at frequency $\omega$ perpendicular to the electrode surfaces, the proof mass moves relative to the frame. This motion is detected by measuring the changes in capacitance between the two electrodes, such as more fully described below. The responsivity of the accelerometer may be calculated as follows. The change in current between the electrodes induced by an applied acceleration $(\partial I/\partial a)$ is given by the product of the change in current induced by a change in separation $(\partial I/\partial x)$ and the change in separation induced by a change in acceleration $(\partial x/\partial a)$. From Newtonian mechanics, we have:

$$\frac{\partial x}{\partial a} = \frac{m}{'k'(1 - \omega^2/\omega'_0{}^2)} \quad (10)$$

where $\omega_0$ is the resonant frequency, $\omega'_0 = ('k'/m)^{\frac{1}{2}}$
From electrostatics, we have:

$$\frac{\partial I}{\partial x} = -\frac{\epsilon_0 A V_0 \omega_1}{(d-x)^2} \quad (11)$$

where $\epsilon_0$ is the permittivity of free space.
Then, the responsivity is given by:

$$\frac{\partial I}{\partial a} = -\frac{m \epsilon_0 A V_0 \omega_1}{(d-x)^2 \cdot 'k'(1 - \omega^2/\omega'_0{}^2)} \quad (12)$$

Several sources of noise are normally encountered in the operation of an accelerometer. Noise in electrical components, or fluctuations due to drifts in temperature are often problematic, but can be controlled through careful design. For the purposes of this disclosure, we may assume that the shot noise in the current produced in the measurement is dominant. Shot noise is unavoidable in any measurement of this type, and imposes a fundamental limitation on the sensitivity of a particular mechanical structure to acceleration. For the device described above, the contribution to the signal due to shot noise is given by:

$$I_n = (2eI)^{\frac{1}{2}} = \left(\frac{2e\epsilon_0 A V_0 \omega_1}{d - x}\right)^{\frac{1}{2}} \quad (13)$$

which has units of Amperes/Hz$^{\frac{1}{2}}$. The minimum dectable acceleration in a given bandwidth, or noise-equivalent acceleration (NEa), is then given by:

$$NEa = \frac{I_n}{(\partial I/\partial a)} = \frac{'k'(1 - \omega^2/\omega'_0{}^2)}{m} \left(\frac{2e(d-x)^3}{\epsilon_0 A V_0 \omega_1}\right)^{\frac{1}{2}} \quad (14)$$

wherein:
$I_n$ = is the sensor current
e = charge of the electron
a = acceleration
m = sensor proof mass
$\omega$ = signal frequency
$\omega'_0$ = effective resonant frequency
$\omega_1$ = excitation frequency of the sensor
$V_0$ = amplitude of the ac excitation voltage
'k' = effective spring constant The NEa depends directly on the value of the spring constant. By reducing the value of the spring constant, as herein disclosed, the accelerometer becomes more sensitive. By way of example, the adjustment 25 or 125 may be used to preset the mass and spring suspension system.

Figure 3:
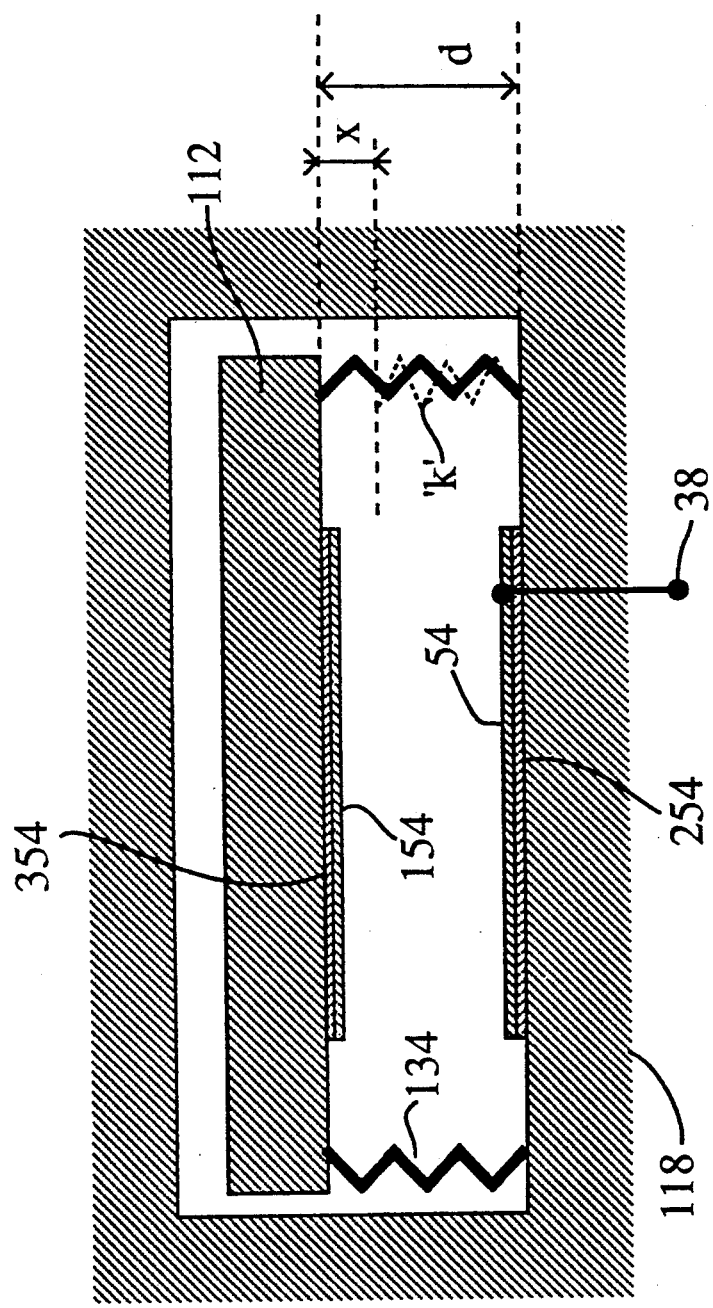
FIG. 3 is a functional diagram of the embodiment of FIG. 1, or a longitudinal section through a sensor according to a further embodiment of the invention.

Summarizing the disclosure herein set forth, the subject invention provides methods and apparatus for improving performance of a sensor having a sensor proof mass 112 elastically suspended at an initial equilibrium position by a suspension force, such as shown in FIG. 1, FIG. 3 at d, FIG. 4 or FIG. 5. Such methods and apparatus according to the invention provide a tunable force opposing the suspension force, and being adjusted or tuned at 25 or 125, for instance.

The proof mass 112 is preset with that tunable force to a second equilibrium position (e.g. d-x) less stable than the initial equilibrium position (e.g. d), and the sensor is operated from that preset second equilibrium position of said proof mass short of instability.

For optimum sensitivity, the proof mass 112 is preset with the tunable force 25, 125 to a second equilibrium position (e.g. d-x) where further presetting movement of that mass would produce instability in the operation of the sensor.

Where the proof mass 112 is suspended by a spring suspension 134, 234 having a first spring constant, k, such spring suspension is preset by the tunable force 25, 125 to an effective second spring constant, 'k', less than the first spring constant but always greater than zero, and the sensor is operated at that effective second spring constant, such as disclosed above with the aid of equations (2) to (9), for instance.

For optimum sensitivity, the proof mass 112 is preset by said tunable force 25, 125 until the spring constant is reduced to a value near zero, and the sensor is operated at the reduced value near but always greater than zero.

As illustrated, for instance, in FIG. 3, the spring suspension 134 is preset by compression with the tunable force 25, 125 to a point (e.g. d-x) where further compression would produce instability in the operation of the sensor, and such sensor is operated at that point short of instability.

According to a preferred embodiment of the invention, the tunable force is provided by a feedback control system, such as shown in the drawings at 32, and the proof mass 112 is reset to the second equilibrium position (e.g. d-x) with that feedback control system during operation of the sensor.

Where the proof mass 112 is suspended by a spring suspension 134 having a first spring constant k, and the tunable force is provided by a feedback control system 32, the spring suspension is preset with that feedback control system to an effective second spring constant 'k' less than the first spring constant but always greater than zero. That effective second spring constant 'k' is maintained with the feedback control system 32 during operation of the sensor.

In the preferred embodiments shown in FIGS. 1 and 3 to 5, the tunable force is an electrostatic force, and the elastically suspended proof mass 112 is controlled electrostatically during operation of the sensor.

The following is an example of a capacitive displacement transducer diagrammatically shown in FIG. 4. In that case, the proof mass 112 is suspended within a cavity of the support structure, or between such support structures 118 by springs 134 and 234. The electrostatic deflection electrodes 54 and 154 are again located between the proof mass 112 and the lower support 118. However, instead of the tunnel electrodes 16 etc., the transducer of FIG. 4 has electrodes 115 and 116 for sensing displacement of the mass 112, such as capacitively. Insulating layers 215 and 216 may be provided for isolating the electrode 115 from mass, if necessary, and the electrode 116 from ground.

Electrostatic forces are again used to reduce the spring constant of the support system 134 in FIG. 4. An alternating voltage source or generator 220 applies a small ac excitation to the electrodes 54 and 154, via resistor R, terminal 121 and lead 21. In the embodiment of FIG. 4, this produces a capacitive current to ground. The current supply resistor R and the impedance of the capacitive arrangement 115-116 constitute a voltage divider producing at the terminal 121 a potential varying as a function of the spacing between capacitive sensor plates 115 and 116 and thereby as a function of the position of the sensor mass 112. The feedback control system 32 has an input connected to that terminal 121 to produce an output signal at 31 indicative of proof mass displacement in response to the sensed force or other quantity. The feedback circuit is again adjusted at 125 to operate at optimum sensitivity.

The embodiment of FIG. 5 is illustrative of a preferred embodiment of the invention which continually measures or monitors the spring constant of the elastic suspension and employs such measurement for determining or adjusting the effective spring constant for substantially constant sensitivity. In other words, the monitored spring constant is continually adjusted to maintain the sensor at a substantially constant sensitivity during operation of the sensor.

A calibration motion may be imposed on the proof mass for this purpose. During operation of the sensor, this calibration motion may be sensed by the feedback control system, for instance, such as to maintain the sensitivity of the sensor at least substantially constant.

By way of example, the second sensor electrode may be subdivided into spaced parts 116, between which a third electrode 117 is located.

The embodiment of FIG. 5 is illustrative of a preferred embodiment of the invention which imposes a calibration motion on the proof mass. That calibration motion is picked up from the proof mass as a signal which is applied to the feedback control system 32 for maintaining the sensor at a substantially constant sensitivity with that feedback control system during operation of the sensor.

By way of example, an oscillating voltage, $V_2$, is applied to the electrode 117 at frequency $\omega_2$ by a second alternating current generator 320 during operation of the sensor. The frequency $\omega_2$ is preferably smaller than $\omega_1$. With an area A for electrode 117, the oscillating voltage $V_2$ exerts an oscillating force on the proof mass with amplitude:

$$F = \frac{\epsilon_0 A V^2}{2(d-x)^2} \tag{15}$$

The mass responds to the combination of the applied force and the suspension forces according to Newton's laws:

$$F - 'k'x = -m\omega_2^2 x \tag{16}$$

therefore, $$\frac{\partial x}{\partial F} = \frac{1}{m(\omega'_0{}^2 - \omega_2^2)} \tag{17}$$

The resulting motion of the proof mass at the frequency $\omega_2$ has an amplitude given by:

$$\text{Amplitude} = \frac{\epsilon_0 A V^2}{2(d-x)^2 m(\omega'_0{}^2 - \omega_2^2)} \tag{18}$$

This signal is detected via the sensing electrodes 115 and 116 by the feedback circuit 32 which adjusts the electrostatic force via electrodes 54 and 154 to maintain the sensitivity of the accelerometer at a fixed or substantially constant value with that feedback control system during operation of the sensor.

Other methods for measuring the spring constant and of adjusting the effective spring constant may, of course, be employed within the scope of the invention. Unlike passive prior-art approaches to sensitivity variations and degradation, preferred embodiments of the subject invention provide active control of sensitivity.

The use of a feedback loop to control the sensitivity of the tuned support system allows sensors to be reliably operated near the instability. This combination of tunable support and feedback control is necessary to make use of this concept in preferred embodiments of the invention.

The invention and its embodiments may, for instance, be implemented by folded beam structures, such as of the type disclosed in the above mentioned preceding patent application Ser. No. 07/685,553 incorporated by reference herein.

The subject extensive disclosure will render apparent or suggest to those skilled in the art various other modifications and variations within the spirit and scope of the subject invention and equivalents thereof.

We claim:

1. A method for operating a sensor having a sensor proof mass elastically suspended at an initial equilibrium position by a suspension force, comprising in combination:
providing a tunable force opposing said suspension force;
presetting said proof mass with said tunable force to a second equilibrium position less stable than said initial equilibrium position; and
operating said sensor from the preset second equilibrium position of said proof mass short of instability.

2. A method as in claim 1, wherein:
said proof mass is preset with said tunable force to a second equilibrium position where further presetting movement of said mass would produce instability in the operation of said sensor.

3. A method as in claim 1, wherein:
said proof mass is suspended by a spring suspension having a first spring constant;
said spring suspension is preset by said tunable force to an effective second spring constant less than said first spring constant but always greater than zero; and
said sensor is operated at said effective second spring constant.

4. A method as in claim 1, wherein:
said proof mass is suspended by a spring suspension having a spring constant;
said proof mass is preset by said tunable force until said spring constant is reduced to a value near zero; and
said sensor is operated at the reduced value near but always greater than zero.

5. A method as in claim 1, wherein:
said proof mass is suspended by a spring suspension;
said spring suspension is preset by compression with said tunable force to a point where further compression would produce instability in the operation of said sensor; and
said sensor is operated at said point short of instability.

6. A method as in claim 1, wherein:
said tunable force is provided by a feedback control system; and
said proof mass is reset to said second equilibrium position with said feedback control system during operation of said sensor.

7. A method as in claim 1, wherein:
said proof mass is suspended by a spring suspension having a first spring constant;
said tunable force is provided by a feedback control system;
said spring suspension is preset with said feedback control system to an effective second spring constant less than said first spring constant but always greater than zero; and
said effective second spring constant is maintained with said feedback control system during operation of said sensor.

8. A method as in claim 1, wherein:
said tunable force is provided by a feedback control system; and
said sensor is maintained at a substantially constant sensitivity with said feedback control system during operation of said sensor.

9. A method as in claim 1, wherein:
an elastic suspension of said proof mass has a spring constant which is monitored; and
said monitored spring constant is continually adjusted to maintain said sensor at a substantially constant sensitivity during operation of said sensor.

10. A method as in claim 1, wherein:
said tunable force is an electrostatic force; and
said elastically suspended proof mass is controlled electrostatically during operation of said sensor.

11. Apparatus for operating a sensor having a sensor proof mass elastically suspended at an initial equilibrium position by a suspension force, comprising in combination:
means for providing a tunable force opposing said suspension force;
means connected to said means for providing a tunable force for presetting said proof mass with said tunable force to a second equilibrium position less stable than said initial equilibrium position; and
means for operating said sensor from the preset second equilibrium position of said proof mass short of instability.

12. Apparatus as in claim 11, wherein:
said proof mass is suspended by a spring suspension having a first spring constant;
said means for presetting said proof mass include means for presetting said spring suspension with said tunable force to an effective second spring constant less than said first spring constant but always greater than zero; and
said means for operating said sensor include means for operating said sensor at said effective second spring constant.

13. Apparatus as in claim 11, wherein:
said proof mass is suspended by a spring suspension having a spring constant;
said means for presetting said proof mass include means for presetting said proof mass with said tunable force until said spring constant is reduced to a value near zero; and
said means for operating said sensor include means for operating said sensor at the reduced value near but always greater than zero.

14. Apparatus as in claim 11, wherein:
said proof mass is suspended by a spring suspension;
said means for presetting said proof mass include means for presetting said spring suspension by compression with said tunable force to a point where further compression would produce instability in the operation of said sensor; and
operating said sensor at said point short of instability.

15. Apparatus as in claim 11, wherein:
said means for providing said tunable force include a feedback control system for resetting said proof mass to said second equilibrium position with said tunable force during operation of said sensor.

16. Apparatus as in claim 11, wherein:
said proof mass is suspended by a spring suspension having a first spring constant;
said means for providing said tunable force, for presetting said proof mass, and for operating said sensor include a feedback control system for presetting said spring suspension with said tunable force to an effective second spring constant less than said first spring constant but always greater than zero, and for maintaining said effective second spring constant with said feedback control system during operation of said sensor.

17. Apparatus as in claim 11, wherein:
said means for providing said tunable force, for presetting said proof mass, and for operating said sensor include a feedback control system for maintaining said sensor at a substantially constant sensitivity during operation of said sensor.

18. Apparatus as in claim 11, wherein:
said means for providing said tunable force include means for providing a tunable electrostatic force; and
said means for presetting said proof mass, and for operating said sensor include means for controlling said elastically suspended proof mass electrostatically during operation of said sensor.

19. Apparatus for operating a sensor having a sensor proof mass elastically suspended at an initial equilibrium position by a suspension force, comprising in combination:
means for monitoring a spring constant of an elastic suspension of said proof mass; and
means connected to said monitoring means for continually adjusting the monitored spring constant to maintain said sensor at a substantially constant sensitivity during operation of said sensor.

20. Apparatus as in claim 19, wherein:
said means for monitoring said spring constant include means for imposing a calibration motion on said proof mass, and means for picking up said calibration motion from said proof mass as a signal; and
said means for continually adjusting said spring constant include a feedback control responsive to said signal for maintaining said sensor at a substantially constant sensitivity during operation of said sensor.

21. Apparatus as in claim 19, including:
means connected to said monitoring means for providing a tunable force opposing said suspension force;
means for tuning said force in response to said monitoring;
means for setting said proof mass with said tuned force to another equilibrium position less stable than said initial equilibrium position; and
means for operating said sensor from the set equilibrium position of said proof mass short of instability while maintaining said substantially constant sensitivity.

* * * * *